United States Patent [19]

Armstrong et al.

[11] Patent Number: 5,764,996
[45] Date of Patent: Jun. 9, 1998

[54] METHOD AND APPARATUS FOR OPTIMIZING PCI INTERRUPT BINDING AND ASSOCIATED LATENCY IN EXTENDED/BRIDGED PCI BUSSES

[75] Inventors: Ross L. Armstrong, Ayr; Alan P. Milne, Troon; Sean N. McGrane, Stewarton, all of United Kingdom; Vikas G. Sontakke, Merrimack; John Lenthall, Nashua, both of N.H.

[73] Assignee: Digital Equipment Corporation, Maynard, Mass.

[21] Appl. No.: 563,221

[22] Filed: Nov. 27, 1995

[51] Int. Cl.$^6$ ................................................. G06F 13/24
[52] U.S. Cl. ........................... 395/733; 395/735; 395/868
[58] Field of Search ................................ 395/733, 734, 395/735, 736, 737, 738, 739, 740, 741, 742

[56] References Cited

U.S. PATENT DOCUMENTS

| | | | |
|---|---|---|---|
| 3,611,305 | 10/1971 | Greenspan et al. | 395/737 |
| 3,719,930 | 3/1973 | Horoshima | 395/737 |
| 4,519,028 | 5/1985 | Olsen et al. | 364/200 |
| 4,908,745 | 3/1990 | Ichiyasu et al. | 364/140 |
| 5,146,595 | 9/1992 | Fujiyama et al. | 395/736 |
| 5,317,747 | 5/1994 | Mochida et al. | 395/725 |
| 5,519,872 | 5/1996 | Khandekar et al. | 395/775 |
| 5,530,875 | 6/1996 | Wach | 395/737 |
| 5,542,076 | 7/1996 | Benson et al. | 395/733 |

FOREIGN PATENT DOCUMENTS

| | | | |
|---|---|---|---|
| 0 511 769 A1 | 4/1992 | European Pat. Off. | G06F 13/24 |
| WO 95/16965 | 1/1994 | WIPO | G06F 13/00 |

OTHER PUBLICATIONS

"PCI Local Bus, PCI BIOS Specification", Jul. 20, 1993, Rev. 2.0.
"PCI–ISA Card Edge Connector, Proposal for Single Board Computer (SBC)", Rev. 2.0, Rev. Date: Oct. 10, 1994.
"PCI–PCI Bridge Board Edge Connector, Proposal for Single Board Computer (SBC)", Rev. 0.1, Rev. Date: Jan. 2, 1995.

*Primary Examiner*—Ayaz R. Sheikh
*Attorney, Agent, or Firm*—Michael A. Rodriguez; Ronald C. Hudgens; Arthur Fisher

[57] ABSTRACT

An apparatus and method of implementing an enhanced PCI interrupt controller which accommodates the industry standard wire-or functionality. With such an arrangement a method and apparatus to identify a source of a PCI interrupt without the need for polling is implemented with a register-based architecture and staged initiator decode. The invention implements both the default industry standard and a non-polled (interrupt accelerator) mode.

10 Claims, 3 Drawing Sheets

METHOD AND APPARATUS FOR OPTIMIZING PCI INTERRUPT BINDING AND ASSOCIATED LATENCY IN EXTENDED/BRIDGED PCI BUSSES

FIELD OF THE INVENTION

The present invention relates to the field of busses, and more particularly to the field of optimizing PCI interrupt binding and associated latency in extended/bridged PCI busses.

BACKGROUND OF THE INVENTION

A peripheral component interconnect bus (PCI bus) is a local bus system capable of moving 32 or 64 bits of data at 33 MHz or 66 MHz. The PCI bus takes peripherals off an input/output bus (I/O bus) and connects them, together with a central processing unit (CPU) and a memory subsystem to a wider, faster pathway for data.

The result is faster data transfer between the CPU and the peripherals. This is important for servers and graphic-intensive software like Windows® and OS/2. Most PCI systems will support three to five performance-critical peripherals. These peripherals will be either integrated directly onto a mother board or can be added via PCI expansion cards, such as multimedia, graphics, disk and LAN adapter cards.

Virtually all Pentium processor personal computers (PCs), for example, shipping today, support the PCI bus. The Pentium processor communicates with its PCI peripheral devices through a special interface chipset, and the design and performance of this chipset can greatly impact the performance of a computer's PCI bus.

Low level software functions, e.g. PCI BIOS functions, provide a software interface to the hardware used to implement a PCI based system. It's primary usage is for system configuration, e.g., address mapping, interrupt routing, etc.

As is also well known, industry standard primary PCI slot provisions adopt a "shared" or "wired-or" interrupt binding architecture, which is typically implemented in the actual mother board etch, i.e. slot interrupt traces are routed in such a way as to provide the shared interrupt scheme. This shared scheme is recommended in the PCI Local Bus Specification, Revision 2.1, incorporated herein by reference.

In such a scheme, the host CPU is required to interrogate PCI devices after receiving an interrupt request in order to determine which PCI device initiated that interrupt. Only then can an interrupt service routine be actioned. This so called "polling method" can take up to a maximum n−1 service routines to complete, given n PCI devices. However, the time to identify the interrupting device is not predictable, e.g. the initiating PCI device may be located after only one poll, or on the last attempt.

As is well known, for small numbers of PCI interrupt sources, e.g. less than four, this polling method implementation is acceptable. For a larger number of PCI devices, potentially implemented via PCI-to-PCI bridging, the shared method of interrupt binding begins to significantly impact interrupt latency, i.e. the time required to determine which PCI device initiated the interrupt.

What is desired is a PCI interrupt controller which accommodates both the existing default industry shared scheme and also an architecture to predictably determine the interrupt initiating PCI device with significantly reduced latency.

SUMMARY OF THE INVENTION

In accordance with the present invention, an exemplary computer system is provided including a central processing unit (CPU), a memory; a PCI host-to-PCI bus interface, the PCI host-to-PCI bus interface connected to the memory and the CPU via a CPU bus, a plurality of PCI devices, the plurality of PCI devices connected to the PCI host-to-PCI bus interface via a primary PCI bus, an interrupt controller unit, the interrupt controller unit including a configuration register, a master interrupt register, and a plurality of interrupt registers, the plurality of interrupt registers providing connection between the master interrupt register and each of the plurality of PCI devices. With such an arrangement, a dual functionality of handling PCI interrupts is implemented, i.e., default industry standard compliance and the present invention's non-polled (interrupt accelerator) mode.

Such an arrangement also provides a deterministic way to identify a source of a PCI interrupt without the need for polling. This is implemented via a register-based architecture and a staged initiator decode.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments, which follow, when read in conjunction with accompanying drawings, wherein:

DETAILED DESCRIPTION

Figure 1:
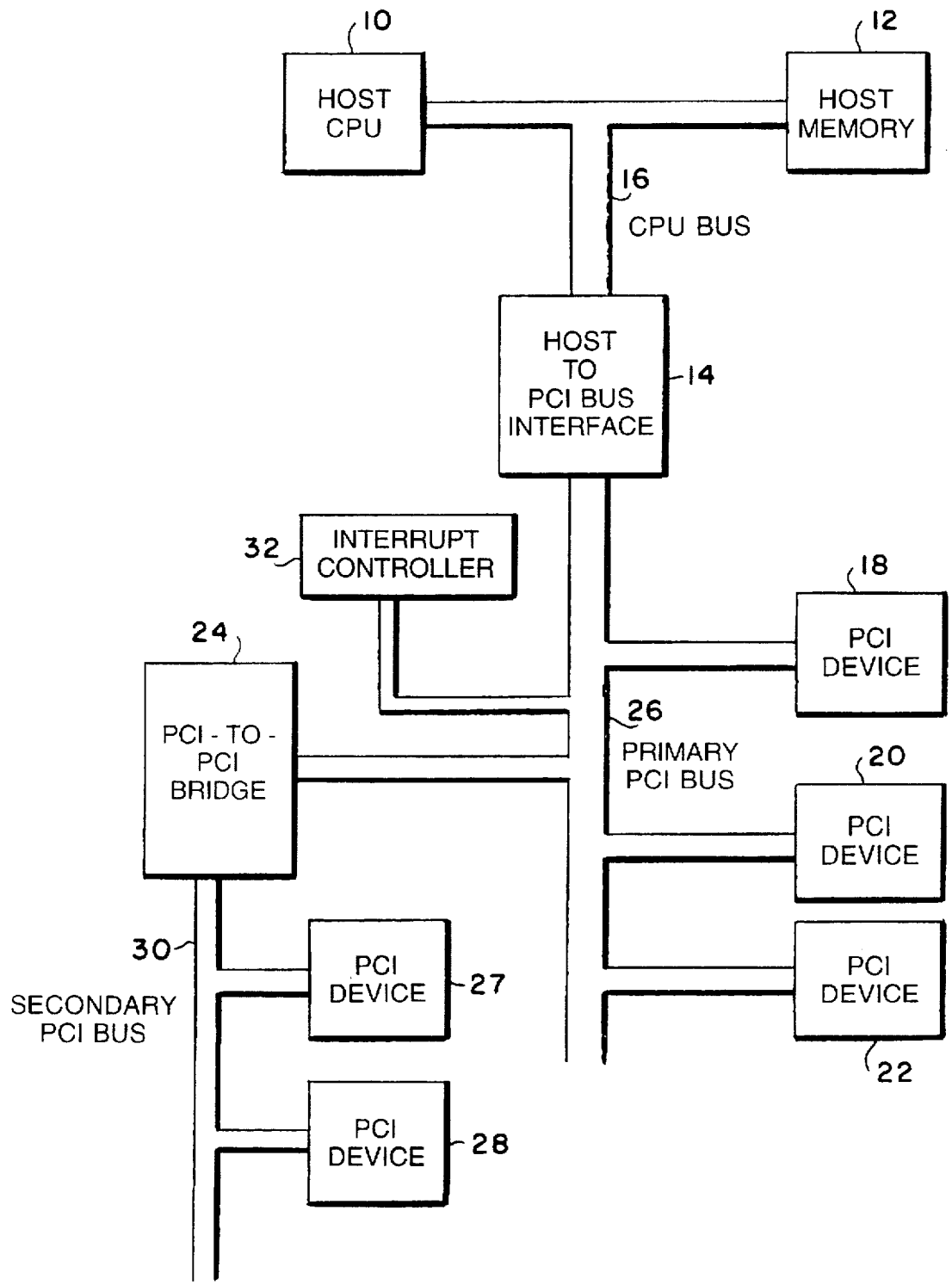
FIG. 1 is a block diagram of an exemplary computer system incorporating several PCI devices.

Referring to FIG. 1, a block diagram of an exemplary computer system in which the present invention may be used is shown to include a host central processing unit (CPU) 10, and a host memory 12. The host CPU 10 and the host memory 12 are shown connected to a host-to-PCI bus interface 14 via a CPU bus 16. The host-to-PCI bus interface 14 provides connection to a number of PCI devices, labeled 18, 20, 22, and 24, respectively, via a primary PCI bus 26. In the exemplary computer system shown in FIG. 1, the PCI device 24 is shown as being a PCI-to-PCI bridge. The PCI-to-PCI bridge 24 provides further connection to PCI device 27 and PCI device 28 via a secondary PCI bus 30.

In the preferred embodiment, the invention resides in an interrupt controller unit 32 located on the primary PCI bus 26. However, there is no technical limiting factor to prevent the present invention from residing in other locations of the exemplary computer system, such as in the CPU bus 16 or some other location directly or indirectly connected to the CPU 10.

Figure 2:
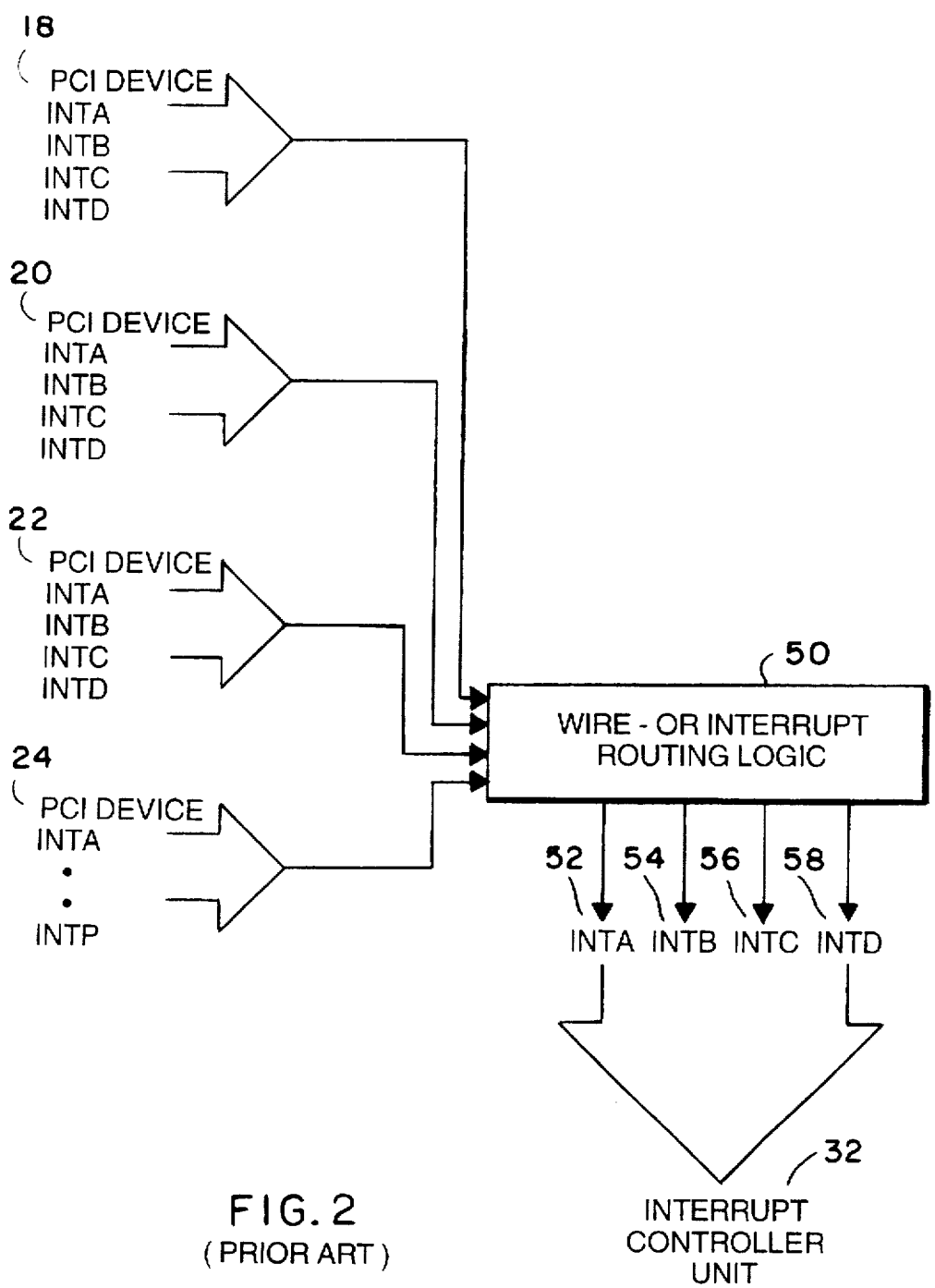
FIG. 2 is an exemplary block diagram of a default industry standard of handling PCI interrupts in the exemplary computer system of FIG. 1.

Referring now to FIG. 2, a exemplary diagram of the default industry standard of handling PCI interrupts is shown to include four interrupt lines, labeled INTA, INTB, INTC, and INTD respectively, for each of the PCI devices in the exemplary computer system of FIG. 1. In the case of PCI device 24 which is a PCI-to-PCI bridge, up to sixteen interrupt lines may be used, i.e., those associated with PCI devices connected to the secondary PCI bus 30. Thus, in the default industry standard mode shown in FIG. 2, all PCI interrupts are simply wire-or'ed in wire-or interrupt routing logic 50 to form interrupts INTA 52, INTB 54, INTC 56, and INTD 58 to the interrupt controller unit 32.

Figure 3:
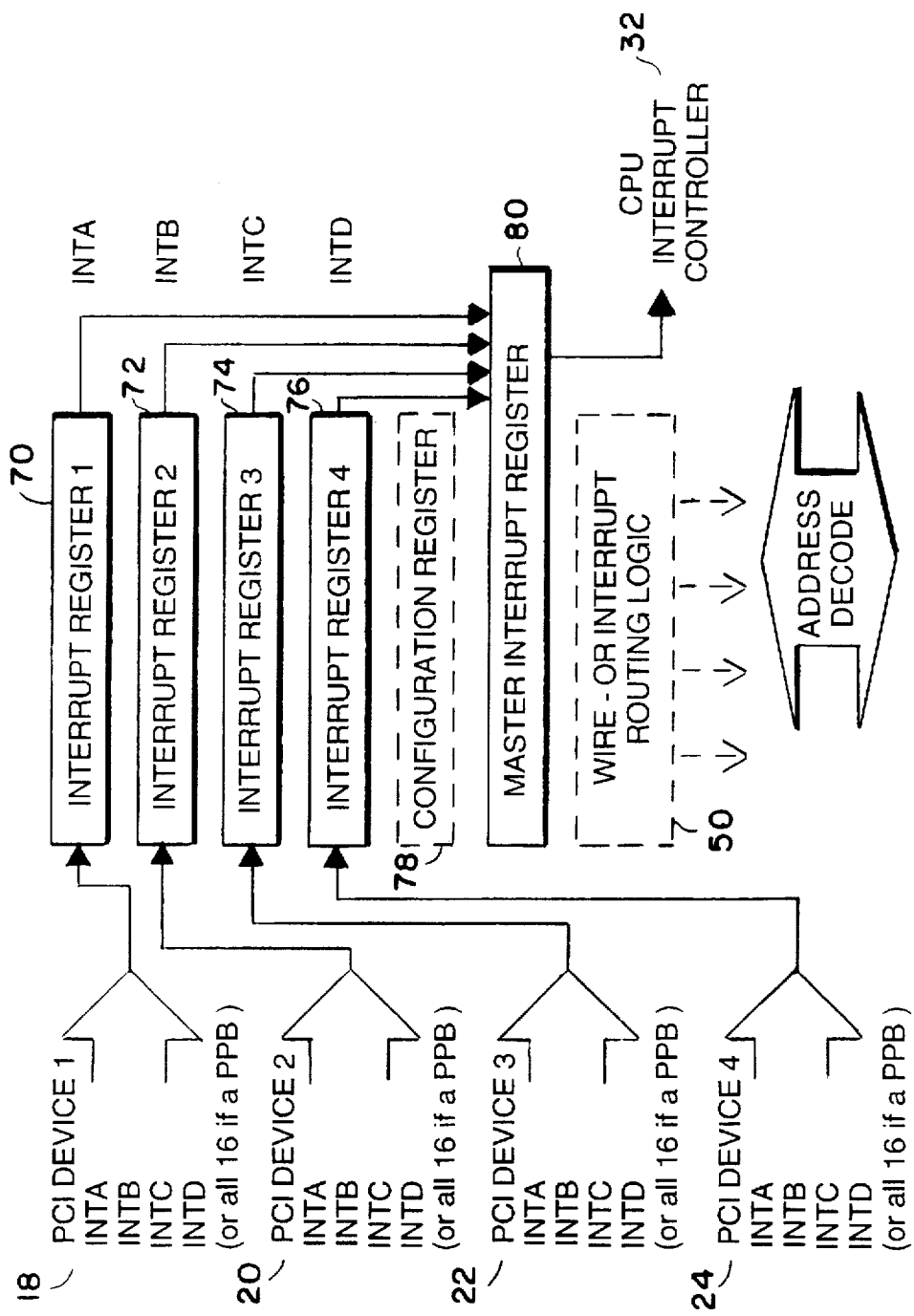
FIG. 3 is a block diagram of handling PCI interrupts in accordance with the present invention.

Referring to FIG. 3, a block diagram in accordance with the present invention is shown not to utilize the wire-or interrupt routing logic 50. In particular, the present invention is shown to include a number of interrupt registers labeled 70, 72, 74, and 76, respectively. The system includes a register for each primary device to provide a status for each PCI interrupt supported by that PCI device. Since the PCI device may be a PCI-to-PCI bridge with four (or other) further PCI devices behind it, each register must be capable of containing sixteen bits of INT# data, four per PCI device. Each interrupt source line also has a corresponding mask bit. FIG. 3 also includes a configuration register 78 and a master interrupt register 80. The configuration register 78 details whether a primary PCI device is a physical connector or a backplane PCI-to-PCI bridge, i.e., whether or not a primary PCI device is a bridge to a secondary PCI bus with devices whose interrupt requests are connected to the present invention. As shown in FIG. 3, each of the interrupt registers is uniquely associated with each of the PCI devices. Specifically, PCI device 18 is shown associated with interrupt register 70, PCI device 20 is shown associated with interrupt register 72, PCI device 22 is shown associated with interrupt register 74, and PCI device 24 is shown associated with interrupt register 76. The association of PCI devices to interrupt registers is more fully described below. The system shown in FIG. 3 may be referred to as "Interrupt Accelerator Mode" so as to distinguish it from the default industry standard mode illustrated in FIG. 2.

The configuration register 78 is always active and controls the behavior of the system in interrupt accelerator mode. The configuration register 78 also contains a mode enable bit which, when set during system startup, indicates that the interrupt accelerator mode shown in FIG. 3 is to be used. If the mode enable bit is not set, then system will default to using the scheme illustrated in FIG. 2. Thus, the present invention accommodates operating in both the default industry standard mode of FIG. 2 and the interrupt accelerator mode shown in FIG. 3.

During system startup, if the mode enable bit is set in the configuration register 78, the interrupt registers 70, 72, 74, and 76 are accessible and are associated with each PCI device or PCI-to-PCI bridge, as shown in FIG. 3. In addition, during startup an address pointer for the four interrupt registers 70, 72, 74, and 76 is stored in the configuration register 78. The master interrupt register 80 is only enabled when the mode enable bit is set. The master interrupt register 80 is flagged directly from the four interrupt registers labeled as 70, 72, 74, and 76, respectively. The master interrupt register 80 is used to determine which interrupt register 70, 72, 74, or 76, should be accessed to find the source of the PCI interrupt. In this way the PCI interrupt source can be reliably and predictably determined in two bus read cycles, i.e., one read to the master interrupt register 80 and one read to the specific interrupt register, i.e., 70, 72, 74, or 76.

A method of identifying a source of an interrupt in a computer system includes: determining whether the mode enable bit is set in the configuration register 78; assigning, in response to determining the mode enable bit is set, each PCI device to one of the interrupt registers 70, 72, 74, 76; receiving in the master interrupt register 80 an interrupt from one of the interrupt registers 70, 72, 74, 76; and reading the configuration register 78 to determine the address of the interrupt register.

The register-based scheme of the present invention is sufficient to support several implementations. For example, in the basic implementation, the present invention may support up to four primary PCI devices or PCI-to-PCI bridges and sixteen secondary PCI devices, i.e., sixty-four individual interrupt lines, four interrupt lines per secondary PCI device. An additional feature designed in the present invention is that all interrupt bits in both the master interrupt register 80 and the four interrupt registers 70, 72, 74, 76 are maskable. Within the configuration register 78 is a mask enable/mode bit. This mask/enable bit can automatically disable the passing through of masked interrupt lines and inherently, the inputs to the master interrupt register 80. This feature is also implemented for the master interrupt mask bits. This improves interrupt latency, since the individual mask bits are no longer required to be read in a separate bus cycle. It also leaves the flexibility for the interrupt polling, i.e., the four (or other) interrupt status bits stored in the master interrupt register 80 match the status of the interrupt register sources. Furthermore, multiple interrupt sources may be detected and prioritized, if required.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A computer system, comprising:

peripheral component interconnect (PCI) devices coupled to a PCI bus, the PCI devices being capable of issuing interrupt requests;

interrupt registers, each interrupt register being associated with only one PCI device and each PCI device being associated with only one interrupt register, each interrupt register issuing an interrupt signal upon receiving an interrupt request from the PCI device associated with that interrupt register; and a master interrupt register, coupled to each interrupt register, receiving an interrupt signal issued by one of the interrupt registers in response to an interrupt request, the master interrupt register including bits, each bit corresponding to one of the interrupt registers and indicating whether the corresponding interrupt register issued the interrupt signal, the master interrupt register identifying which one of the interrupt registers issued the interrupt signal to identify the PCI device associated with the identified interrupt register as a source of the interrupt request.

2. The system of claim 1, further comprising:

a device storing an address of the interrupt registers, the address being used to access the interrupt register identified by the master interrupt register as having issued the interrupt signal.

3. The system of claim 1, wherein each interrupt register includes bits, each bit of an interrupt register corresponding to an interrupt line that can be used by the PCI device associated with that interrupt register to issue an interrupt request, each bit indicating whether an interrupt request has been issued on that corresponding interrupt line; and further comprising:

means for masking out one or more bits of an interrupt register to block that interrupt register from issuing an interrupt signal when the PCI device associated with that interrupt register issues an interrupt request on the interrupt line corresponding to a masked out bit.

4. The system of claim 1, further comprising:

means for masking out one or more bits of the master interrupt register to block the master interrupt register from supplying a signal when the bit corresponding to the interrupt register that issued the interrupt signal is masked out.

5. The system of claim 1, further comprising:

a device coupled to each PCI device on the PCI bus, the device supplying a signal when one of the PCI devices issues an interrupt request; and means for enabling the interrupt registers and the master interrupt register while disabling the device so that the interrupt registers and the master interrupt register are selected for determining the source of the interrupt request instead of the device.

6. The system of claim 1, further comprising:

a PCI-to-PCI bridge coupled between the PCI bus and a second bus, the PCI-to-PCI bridge being associated with one of the interrupt registers; and PCI devices coupled to the second PCI bus each being capable of issuing interrupt requests, the PCI-to-PCI bridge forwarding interrupt requests issued by the PCI devices coupled to the second bus to the interrupt register associated with the PCI-to-PCI bridge.

7. An interrupt controller, comprising:

interrupt registers, each interrupt register being associated with only one of a plurality of peripheral component interconnect (PCI) devices coupled to a PCI bus and each PCI device being associated with only one interrupt register, each interrupt register issuing an interrupt signal upon receiving an interrupt request on one of a plurality of interrupt lines from the associated PCI device;

a master interrupt register, coupled to each interrupt register, receiving an interrupt signal issued by one of the interrupt registers in response to an interrupt request, the master interrupt register including bits, each bit corresponding to one of the interrupt registers and indicating whether the corresponding interrupt register issued the interrupt signal, the master interrupt register identifying which one of the interrupt registers issued the interrupt signal; and a device storing an address of the interrupt registers, the address being used to access the interrupt register identified by the master interrupt register as having issued the interrupt signal, the identified interrupt register identifying an interrupt line that was used by the PCI device associated with the identified interrupt register to issue the interrupt request.

8. A method for determining a source of interrupt requests, comprising the steps of:

associating interrupt registers with peripheral component interconnect (PCI) devices coupled to a PCI bus, each interrupt register being associated with only one PCI device and each PCI device being associated with only one interrupt register, each PCI device being capable of issuing interrupt requests to the interrupt register associated with that PCI device;

issuing an interrupt signal to a master interrupt register, by one of the interrupt registers, in response to an interrupt request, the master interrupt register including bits, each bit corresponding to one of the interrupt registers, each bit indicating whether the corresponding interrupt register issued the interrupt signal; and identifying from the bits of the master interrupt register which interrupt register issued the interrupt signal.

9. The method of claim 8, further comprising the steps of:

reading a register to obtain an address of the interrupt register identified as having issued the interrupt signal; and reading the identified interrupt register to determine which interrupt line the PCI device associated with the identified interrupt register used to issue the interrupt request.

10. The method of claim 8, further comprising the steps of:

reading an enable bit; and wherein the steps of associating, issuing, and identifying occur only if the enable bit is set, otherwise polling each PCI device to determine which of the PCI devices issued the interrupt request.

* * * * *